United States Patent [19]
Lucas

[11] Patent Number: 5,258,795
[45] Date of Patent: Nov. 2, 1993

[54] ATTITUDE SENSOR FOR DETERMINING CAMERA ORIENTATION

[75] Inventor: Frederick T. Lucas, Rochester, N.Y.

[73] Assignee: Eastman Kodak Company, Rochester, N.Y.

[21] Appl. No.: 933,648

[22] Filed: Aug. 24, 1992

[51] Int. Cl.⁵ .................. G03B 17/00; G03B 19/00
[52] U.S. Cl. .............................. 354/289.12; 354/354
[58] Field of Search ............... 354/202, 289.1, 289.11, 354/289.12, 354

[56] References Cited

U.S. PATENT DOCUMENTS

| | | | |
|---|---|---|---|
| 3,552,283 | 1/1971 | Babcock et al. | 95/1.1 |
| 3,661,061 | 5/1972 | Tokarz | 95/1.1 |
| 3,675,549 | 7/1972 | Adair | 95/1.1 |
| 4,097,897 | 6/1978 | Morris | 358/162 |
| 4,183,645 | 1/1982 | Ohmura et al. | 354/106 |
| 4,801,793 | 1/1989 | Vaynshteyn | 354/289.12 |
| 5,122,827 | 6/1992 | Saegusa et al. | 354/410 |

Primary Examiner—Michael L. Gellner
Assistant Examiner—Nicholas J. Tuccillo
Attorney, Agent, or Firm—Roger A. Fields

[57] ABSTRACT

An attitude sensor for determining camera orientation comprises gravity responsive means supported for movement to various positions in accordance with changes in camera orientation and fixed means for determining the gravity responsive means has moved to anyone of its positions. The gravity responsive means includes a plurality of discrete sections which have different degrees of light reflectivity or light transmissivity and are arranged to alternately occupy a predetermined location when the gravity responsive means is moved to respective ones of its positions. The fixed means includes photo-emitting means for directing light to whichever one of the discrete sections of the gravity responsive is occupying the predetermined location and photo-responsive means for providing a measure of light reflected from or transmitted by that one section.

3 Claims, 2 Drawing Sheets

ATTITUDE SENSOR FOR DETERMINING CAMERA ORIENTATION

BACKGROUND OF THE INVENTION

1. Field of the Invention

The invention relates generally to the field of photography, and in particular to an attitude sensor for determining camera orientation.

2. Description of the Prior Art

Orientation indicating devices to facilitate accurate horizontal positioning of cameras are generally well known. Typically, a spirit level has been used as an attitude sensor for determining orientation of the camera. The spirit level comprises a sealed glass tube filled almost completely with a liquid, leaving a small air bubble. As long as the tube is truly horizontal, the bubble will lie exactly between two reference marks in the middle of the tube to indicate the camera is horizontal. If the tube is inclined left or inclined right along its length because of similar movement of the camera, the bubble will move to the right or the left of the reference marks. However, it is difficult to adjust the tube to locate the bubble between the reference marks and at the same time frame a subject to be photographed.

Commonly assigned U.S. Pat. No. 4,801,793, issued Jan. 31, 1989, discloses an orientation indicating device for visibly indicating in the viewfinder of a camera that the camera is deviated improperly from a normal horizontal position to take a picture. Specifically, the device comprises a pendulum-like contact swingably suspended from a fixed point, but urged to remain vertical by gravity, and a plurality of spaced fixed contacts disposed to make respective electrical connection with the pendulum-like contact as the camera is deviated inclined-left or inclined-right from its normal horizontal position. When the camera is deviated inclined-right or inclined-left, the resulting electrical connection activates orientation indicating means to provide a visible indication of the camera orientation.

PROBLEM TO BE SOLVED BY THE INVENTION

The use of an electrical switch as an attitude sensor for determining camera orientation, such as disclosed in U.S. Pat. No. 4,801,793, may be unreliable in some ambient conditions, for example extreme humidity or extreme cold, because of frictional or other mechanical resistance to closing the switch.

SUMMARY OF THE INVENTION

According to the invention there is provided an attitude sensor for determining camera orientation comprising gravity responsive means supported for movement to various positions in accordance with changes in camera orientation and fixed means for determining the gravity responsive means has moved to anyone of its positions, characterized in that:

said gravity responsive means includes a plurality of discrete sections which have different degrees of light reflectivity or light transmissivity and are arranged to alternately occupy a predetermined location when the gravity responsive means is moved to respective ones of its positions; and said fixed means includes photo-emitting means for directing light to whichever one of the discrete sections of the gravity responsive is occupying the predetermined location and photo-responsive means for providing a measure of light reflected from or transmitted by that one section.

DETAILED DESCRIPTION OF THE PREFERRED EMBODIMENT

The invention is disclosed as being embodied in a 35 mm still camera. Because such a type of camera is well known, this description is directed in particular to elements of the camera forming part of or cooperating directly with the preferred embodiment. It is to be understood, however, that elements of the camera not specifically shown or described may take various forms known to persons of ordinary skill in the art.

Figure 1:
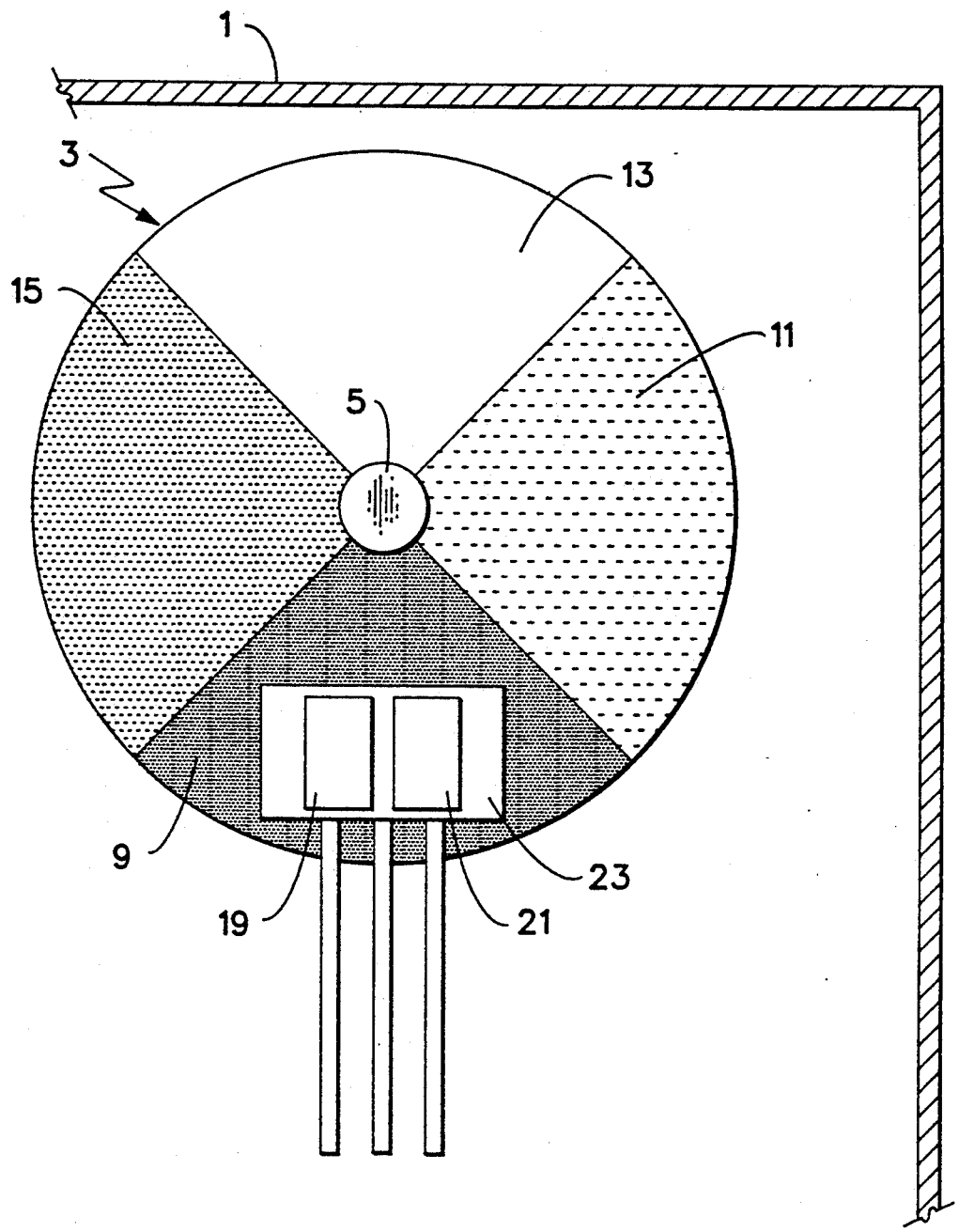
FIG. 1 is a front elevation view of an attitude sensor for determining camera orientation according to a preferred embodiment of the invention.
Figure 2:
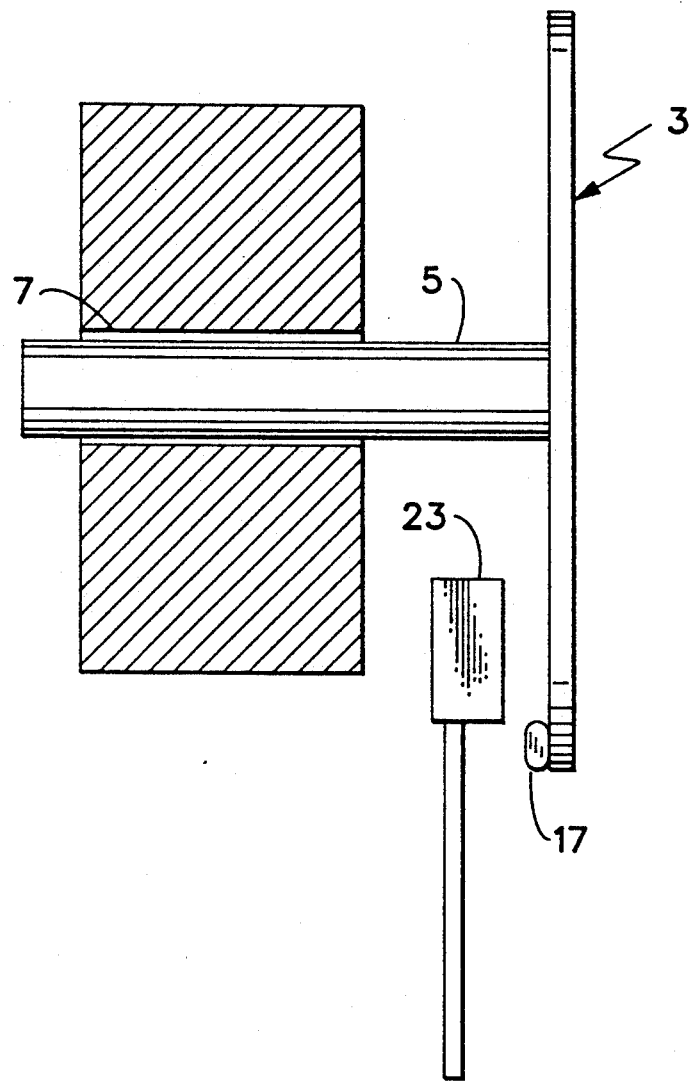
FIG. 2 is a side elevation view of the attitude sensor.

Referring now to the drawings, FIGS. 1 and 2 show a camera body 1 (in part) in which resides a disk 3 supported at its center for rotation by a shaft 5 which, in turn, is supported in a bearing 7. The disk 3 on one side is divided into four equal size quadrant sections 9, 11, 13 and 15 each having a significantly different degree of infrared reflectivity and on another side has a weight 17 which gravity urges respective ones of the quadrant sections to be lowermost in FIGS. 1 and 2 in accordance with changes in orientation of the camera body 1. A single known infrared emitter 19 and a single known infrared detector (photometer) 21 are supported side-by-side in an encapsulation 23 for directing infrared light to whichever one of the four quadrant sections 9, 11, 13 and 15 is located opposite the emitter and the detector and for providing a voltage measure of the infrared light reflected from that one section. For example, when the camera body 1 is horizontally oriented correct side up, the quadrant section 9 is located opposite the infrared emitter 19 and the infrared detector 21 as shown in FIGS. 1 and 2 and the voltage measure is 5.0 volts; when the camera body is horizontally oriented upside down, the quadrant section 13 is located opposite the emitter and the detector and the voltage measure is 0.0 volts; when the camera body is vertically oriented right up, the quadrant section 15 is located opposite the emitter and the detector and the voltage measure is 3.3 volts; and when the camera body is vertically oriented left side up, the quadrant section 11 is located opposite the emitter and the detector and the voltage measure is 1.6 volts. A known microcomputer (not shown) is connected to the infrared emitter 19 and the infrared detector 21 for receiving the voltage measure provided by the infrared detector and comparing that measure with standards in a look-up table to determine whether the camera body 1 is horizontally oriented correct side up, is horizontally oriented upside down, is vertically oriented right side up, or is vertically oriented left side up. The microcomputer is connected to a plurality of light-emitting diodes (not shown) for activating certain ones of the light-emitting diodes to provide a visible indication of the camera orientation.

The invention has been described with reference to a preferred embodiment. However, it will be appreciated that various modifications can be effected within the ordinary skill in the art without departing from the scope of the invention. According to one example, the four quadrant sections 9, 11, 13 and 15 of the disk 3 can be light transmissive instead of light reflective. In this instance, the infrared emitter 19 and the infrared detector 21 would be located opposite one another with the disk 3 between them rather than located side-by-side as shown in FIG. 1. According to another example, instead of the emitter 19 and the detector 21 being infrared types, they can be another electromagnetic radiation type. In this instance, the four quadrant sections 9, 11, 13 and 15 would be compatibly light reflective or light transmissive.

I claim:

1. An attitude sensor for determining camera orientation comprising gravity responsive means supported for movement to various positions in accordance with changes in camera orientation and fixed means for determining said gravity responsive means has moved to anyone of its positions, is characterized in that:

said gravity responsive means includes a plurality of discrete sections which have different degrees of light reflectivity or light transmissivity and are arranged to alternately occupy a predetermined location when the gravity responsive means is moved to respective ones of its positions; and said fixed means includes photo-emitting means for directing light to whichever one of the discrete sections of said gravity responsive is occupying said predetermined location and photo-responsive means for providing a measure of light reflected from or transmitted by that one section.

2. An attitude sensor as recited in claim 1, wherein said photo-emitting means includes an infrared emitter and said photo-responsive means includes an infrared detector.

3. An attitude sensor as recited in claim 1, wherein said gravity responsive means includes a disk supported at its center for rotation and having a weight at a segment of its periphery for rotating said disk to said positions of the gravity responsive means in accordance with changes in camera orientation, and said discrete sections of said gravity responsive means are quadrants of said disk.

* * * * *